S. H. STUPAKOFF.
METHOD OF PRODUCING DRAWN SHEET GLASS.
APPLICATION FILED SEPT. 6, 1904. RENEWED SEPT. 4, 1914.
1,136,290.
Patented Apr. 20, 1915.
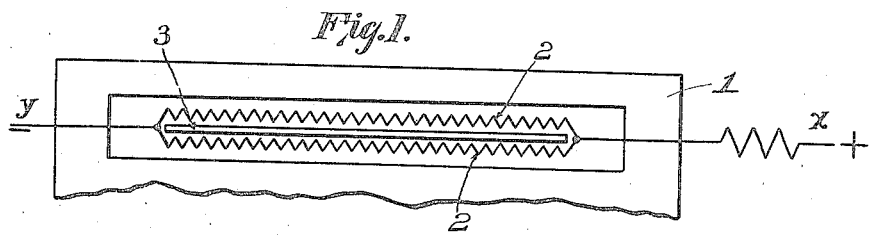
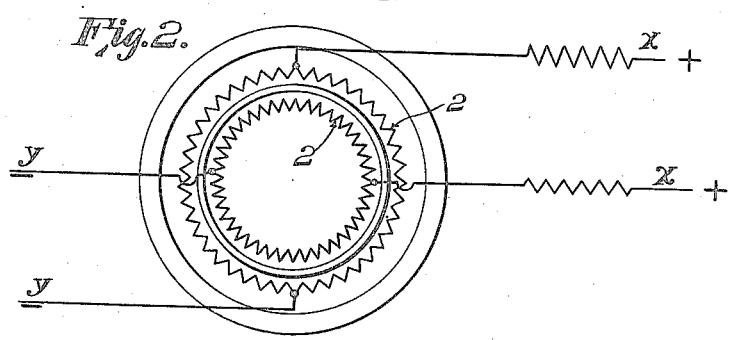
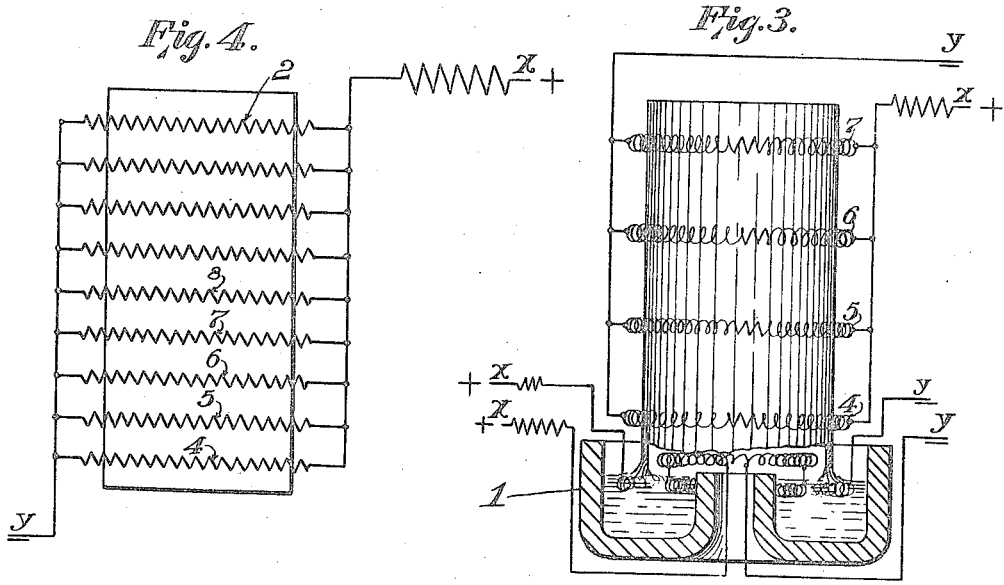
Witnesses:
James E. Herron
P. A. Williams
Inventor:
Simon H. Stupakoff
per John H. Roney
Att'y.

UNITED STATES PATENT OFFICE.

SIMON H. STUPAKOFF, OF PITTSBURGH, PENNSYLVANIA.

METHOD OF PRODUCING DRAWN SHEET-GLASS.

1,136,290.

Specification of Letters Patent.

Patented Apr. 20, 1915.

Application filed September 6, 1904, Serial No. 223,345. Renewed September 4, 1914. Serial No. 860,301.

*To all whom it may concern:*

Be it known that I, SIMON H. STUPAKOFF, a citizen of the United States, residing at Pittsburgh, in the county of Allegheny and State of Pennsylvania, have discovered or invented a new and useful Improvement in Methods of Producing Drawn Sheet-Glass, of which improvement the following is a specification.

My invention relates to improvements in methods for producing drawn glass, and consists, broadly stated, in converting the glass into a molten mass, and maintaining such mass at a temperature to insure the requisite plasticity therein to enable the production of sheets drawn therefrom of a required uniform thickness, and subjecting the various parts of the sheet in its passage from the receptacle containing the molten mass to varying zones of heat corresponding in temperature with that of the portions of the sheet passing therethrough.

In the manufacture of drawn glass, it is of the greatest importance commercially that the sheets or cylinders are of uniform thickness throughout, and to obtain such uniformity the following conditions are absolutely essential; viz: First, the mass or matrix of molten glass, from which the sheets or cylinders are drawn, must be brought to the proper temperature to produce the requisite plasticity thereof and must be maintained at such temperature during the drawing operation. Secondly, the drawings must be done with proper speed or velocity dependent upon the thickness required. It is also important that the sheets or cylinders after being drawn from the mass be uniformly annealed, consequently it is of the utmost importance that the sheets, &c., after withdrawal from the mass should pass or be conveyed through varying zones of heat which corresponds in temperature to the portions of the sheet subjected thereto.

Heretofore, so far as I am aware, the method employed in the production of drawn glass has been inefficient and inadequate to maintain the molten mass of glass at that requisite unvarying temperature essential to constantly maintain the glass at the plasticity requisite to insure the production of uniformly thick product. It has also been impossible with the method employed to effect the annealing of the product by a process substantially continuous of the drawing operation.

The object of the invention is to obviate these difficulties and to produce in a molten mass or matrix of glass a given requisite temperature and to maintain the said mass at such temperature without variation so as to insure constant requisite plasticity in the mass, and to provide a method whereby the product is substantially continuous of its drawing subjected to varying degrees of heat whereby the same is properly and uniformly annealed.

In the application of my method or invention, the molten glass or matrix of metal is subjected to heat electrically generated by passing an electric current of requisite strength through suitable resistances placed or located in the mass, in the immediate vicinity or closely adjacent to that portion of the mass from which the product is drawn, and substantially continuous of the drawing operation to subject the said product to varying zones of heat electrically generated by passing electric currents through gradually varying resistances. The zones of heat varying with and corresponding to the temperature of the portions or parts respectively of the sheet subjected thereto. It is obvious that my method is applicable to any molten mass of matter or glass in which a given plasticity is requisite to manipulate and produce finished product therefrom, requiring given dimensions or thickness therein.

In the accompanying drawings, I show an apparatus adapted to the application of my invention, in which—

Figure 1 shows a plan view of a portion of a crucible or pot with resistances shown as located therein. Fig. 2 is a horizontal sectional view of a modified form adapted to the production of cylinders or glass. Fig. 3 is an elevation of the apparatus; and Fig. 4 is a diagrammatic view of the conductors and resistances shown in Fig. 3 exteriorly of the glass receptacle.

In the drawings, the numeral 1 designates a pot or receptacle adapted to contain glass brought to a molten or plastic condition. The said glass may be brought to this condition in a separate chamber or pot which may be suitably connected to said receptacle 1, if desired.

The numerals 2—2 designate resistances which are supported in any suitable manner and submerged in the molten glass below the surface thereof. These resistances may receive electric current from any suitable source, and are shown as connected to the terminals X and Y of an electric circuit.

3, is a sheet of glass drawn by inserting a ponty in the mass in the usual manner and withdrawing the same in the usual manner, the sheet or cylinder so drawn being surrounded by the resistance as shown in the drawings and being subjected to the heat generated thereby, the said resistances being so regulated with reference to the current passing therethrough that a given requisite temperature is maintained at the different points or zones through which the product passes or is conveyed after leaving the mass.

The resistances designated 4, 5, 6, 7 and 8, are in circuit with conductors independent from that which supplies electric current to the resistance located in the mass of metal and are for the purpose of producing varying heat in the different zones through which the sheet is conveyed or carried after it has been withdrawn from the mass, the said resistances 4, 5, 6, 7 and 8 being graduated with reference to the current passing therethrough so as to produce varying temperatures in the zones adjacent thereto.

I claim as my invention and desire to secure by Letters Patent:

1. The method of shaping glass, consisting in drawing glass from a molten glass bath and maintaining the glass being drawn at substantially the same temperature throughout at least a part of the drawing operation.

2. The method of shaping glass, consisting in drawing glass from a glass bath, and simultaneously supplying heat to the bath to maintain the same at substantially the same temperature during the drawing operation.

3. The method of forming glass, consisting in drawing glass from a glass bath and maintaining the top portion of the bath at substantially the same temperature through at least part of the drawing.

4. The method of shaping glass, consisting in drawing glass from a glass bath and generating electric heat in said bath during the drawing operation to maintain the glass at substantially the same temperature and thereby prevent thickening of the wall of the article being drawn by the cooling and stiffening of the glass.

5. The method of shaping glass, consisting in drawing glass from a glass bath and generating electric heat in the surface portion of the bath during the drawing operation to maintain the glass at substantially the same temperature and thereby prevent thickening of the wall of the article being drawn by the cooling and stiffening of the glass.

6. The method of shaping glass, consisting in drawing glass from a molten glass bath, supplying heat thereto during the drawing operation, and varying the heat to maintain a constant temperature of the bath as the drawing proceeds.

7. The method of shaping glass, consisting in drawing glass from a glass bath, supplying heat to the glass of the bath, and automatically varying the amount of heat supplied to maintain a constant temperature of the bath through the drawing operation.

8. The method of shaping glass, consisting in drawing glass from a molten glass bath, and maintaining the surface portion of the bath adjacent to all points of the draw at substantially the same temperature through at least part of the drawing operation.

9. The method of forming hollow glass articles, consisting in drawing the hollow article from a molten glass bath, and heating the portions of the glass surrounding the drawing plane at substantially uniform temperature through the drawing operation.

10. In the art of drawing glass, the method which consists in applying heat to the molten glass during the drawing operation, and regulating the heat to cause that portion of the glass from which the drawing takes place to remain at a substantially constant temperature during a substantial part of the drawing operation.

In testimony whereof, I have hereunto signed my name in the presence of two subscribing witnesses.

SIMON H. STUPAKOFF.

In the presence of—
CLARENCE A. WILLIAMS,
JAMES C. HERRON.